US010857905B2

(12) United States Patent
Katabuchi

(10) Patent No.: US 10,857,905 B2
(45) Date of Patent: Dec. 8, 2020

(54) ELECTRONIC CONTROL UNIT

(71) Applicant: Hitachi Automotive Systems, Ltd., Hitachinaka (JP)

(72) Inventor: Hiroki Katabuchi, Isesaki (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/646,789

(22) PCT Filed: Sep. 14, 2018

(86) PCT No.: PCT/JP2018/034185
§ 371 (c)(1),
(2) Date: Mar. 12, 2020

(87) PCT Pub. No.: WO2019/054482
PCT Pub. Date: Mar. 21, 2019

(65) Prior Publication Data
US 2020/0262309 A1 Aug. 20, 2020

(30) Foreign Application Priority Data

Sep. 15, 2017 (JP) .................................. 2017-177552

(51) Int. Cl.
*H02J 7/00* (2006.01)
*B60L 58/12* (2019.01)
*H02H 11/00* (2006.01)

(52) U.S. Cl.
CPC ............ *B60L 58/12* (2019.02); *H02H 11/003* (2013.01); *H02J 7/0034* (2013.01)

(58) Field of Classification Search
CPC ....... B60L 58/12; H02H 11/003; H02J 7/0034
See application file for complete search history.

(56) References Cited

U.S. PATENT DOCUMENTS 6,060,794 A * 5/2000 Takagi ................... E05F 15/40
307/113
2002/0021115 A1* 2/2002 Freund .................. H02M 3/155
323/282

(Continued)

FOREIGN PATENT DOCUMENTS

JP 2005-149092 A 6/2005
JP 2013-66321 A 4/2013

(Continued)

OTHER PUBLICATIONS

International Search Report (PCT/ISA/210) issued in PCT Application No. PCT/JP2018/034185 dated Dec. 4, 2018 with English translation (three (3) pages).

(Continued)

*Primary Examiner* — Arun C Williams
(74) *Attorney, Agent, or Firm* — Crowell & Moring LLP

(57) ABSTRACT

The ECU includes first and second power terminals, first and second voltage limiting elements, first and second diodes, and a power supply IC. A voltage is applied to the first power terminal from a battery, and a voltage is applied to the second power terminal from the battery via a start switch. The first voltage limiting element is provided between the first power terminal and an input terminal of the power supply IC. The cathode of the first diode is connected to the input terminal of the power supply IC. The second voltage limiting element is provided between the second power terminal and the anode of the first diode. The cathode of the second diode is connected to the anode of the first diode, and the anode is grounded. A limit voltage of the first voltage limiting element is greater than a limit voltage of the second voltage limiting element.

16 Claims, 5 Drawing Sheets

(56) References Cited

U.S. PATENT DOCUMENTS

| | | | | |
|---|---|---|---|---|
| 2004/0178776 A1* | 9/2004 | Hansen | | H02M 3/156 |
| | | | | 323/266 |
| 2005/0116744 A1* | 6/2005 | Iwagami | | H03K 17/08148 |
| | | | | 327/108 |
| 2013/0193754 A1* | 8/2013 | Sugiyama | | B60L 58/10 |
| | | | | 307/10.7 |
| 2014/0002100 A1* | 1/2014 | Feucht | | H02H 9/043 |
| | | | | 324/537 |
| 2018/0026548 A1* | 1/2018 | Laven | | H02M 1/32 |
| | | | | 363/56.01 |

FOREIGN PATENT DOCUMENTS

| | | |
|---|---|---|
| JP | 2013-151220 A | 8/2013 |
| JP | 2015-80955 A | 4/2015 |

OTHER PUBLICATIONS

Japanese-language Written Opinion (PCT/ISA/237) issued in PCT Application No. PCT/JP2018/034185 dated Dec. 4, 2018 with English translation (six (6) pages).

* cited by examiner

FIG.5

| | DRAIN VOLTAGE VD OF MOSFET Tr3 | INPUT VOLTAGE VI OF POWER SUPPLY IC 11 |
|---|---|---|
| NEGATIVE SURGE APPLIED TO POWER TERMINAL VBATT | VD = Vign−Vfz2−Vfd1−Vz1 AVOID DAMAGE TO MOSFET Tr3 | VI = Vign−Vfz2−Vfd1 |
| NEGATIVE SURGE APPLIED TO POWER TERMINAL VIGN | VD = Vbatt | VI = Vbatt−Vfz1 |
| NEGATIVE SURGE SIMULTANEOUSLY APPLIED TO POWER TERMINALS VBATT AND VIGN | VD = −Vfd2−Vz2 | VI = −Vfd2−Vz2+Vz1 AVOID SHUTDOWN OF POWER SUPPLY IC 11 |

ELECTRONIC CONTROL UNIT

TECHNICAL FIELD

The present invention relates to in-vehicle electronic control units having a surge protection function for protecting a power input unit from a negative surge.

BACKGROUND ART

Conventionally, an in-vehicle electronic control unit is provided with a reverse input protection circuit to protect an internal circuit from a reverse input caused by a reverse connection of a battery terminal due to human error, or the like. Furthermore, a surge protection circuit is provided in a power input unit, to protect the internal circuit from a surge voltage generated by a switching operation, or the like, when driving a load.

For example, Patent Document 1 discloses an in-vehicle control unit that includes a reverse input protection circuit including MOSFETs, and that protects the MOSFETs when a surge voltage occurs. According to the disclosure of Patent Document 1, even if a voltage of the battery drops to near an operable limit voltage of an electronic control unit (ECU), the operation of the ECU can be ensured, and even if a surge voltage is applied, the internal circuit of the ECU can be protected and a reset of the ECU can be avoided.

REFERENCE DOCUMENT LIST

Patent Document

Patent Document 1: JP2013-66321 A

SUMMARY OF THE INVENTION

Problem to be Solved by the Invention

However, in such a circuit configuration as disclosed in Patent Document 1, when a negative surge is applied to a battery terminal, the surge voltage is directly applied to the drain of a FET for reverse input protection. Thus, an expensive element with a high breakdown voltage is required. Furthermore, when the reverse input protection FET and a switching FET for use with the reverse input protection FET, are used for protection from a negative surge voltage, this configuration requires a large number of elements, including those for peripheral circuits for controlling these FETs. This increases a mounting area on the circuit board. This causes an increase in size of the electronic control unit and an increase in product cost.

The present invention has been made in view of these circumstances, and an object of the present invention is to provide an electronic control unit capable of reducing the size and cost while maintaining a protection function from a negative surge voltage and a reverse input protection function.

Means for Solving the Problem

According to an aspect of the present invention, an electronic control unit comprises:
a first power terminal to which a voltage is applied from a battery mounted on a vehicle,
a second power terminal to which a voltage is applied from the battery via a start switch;
a power supply IC that generates an internal operating voltage from the voltages applied to the first and second power terminals from the battery;
a first voltage limiting element provided between the first power terminal and an input terminal of the power supply IC, the first voltage limiting element being configured to limit a voltage on the first power terminal side to a predetermined negative voltage;
a first diode having a cathode that is connected to the input terminal of the power supply IC;
a second voltage limiting element provided between the second power terminal and an anode of the first diode, the second voltage limiting element being configured to limit a voltage on the second power terminal side to a predetermined negative voltage greater than a limit voltage of the first voltage limiting element; and
a second diode having a cathode that is connected to the anode of the first diode, and an anode that is grounded.

Effects of the Invention

According to the present invention, since the first voltage limiting element limits the voltage at the first power terminal side to the predetermined negative voltage, and the second voltage limiting element limits the voltage at the second power terminal side to the predetermined negative voltage, it is possible to prevent the first and/or second power terminals from being applied with excessive negative voltages, to thereby protect the internal circuit from a negative surge. Furthermore, since the limit voltage of the first voltage limiting element is greater than the limit voltage of the second voltage limiting element, it is possible to prevent a decrease in input terminal voltage, which might cause shutdown of the power supply IC. Furthermore, since the second diode provided in the current path extending from the second power terminal to the power supply IC is shared by the protection paths to the first and second power terminals, it is possible to reduce the number of components.

Thus, it is possible to achieve a simple circuit configuration having the surge protection function and the reverse input protection function, equivalent to those in conventional art.

Therefore, by reducing the number of components, and by reducing the mounting area on the circuit board, it is possible to reduce the size. Furthermore, since the surge protection is performed by using the first and second voltage limiting elements to prevent any section from being applied with a high voltage, it is not necessary to use an expensive, high breakdown voltage element, resulting in a decrease in cost.

BRIEF DESCRIPTION OF THE DRAWINGS

FIG. 5 is a table for explaining the drain voltage of a reverse input protection MOSFET and the input voltage of a power supply IC, when the power terminals are applied with negative surges.

MODE FOR CARRYING OUT THE INVENTION

Hereinbelow, embodiments of the present invention will be described with reference to the accompanying drawings.

First Embodiment

Figure 1:
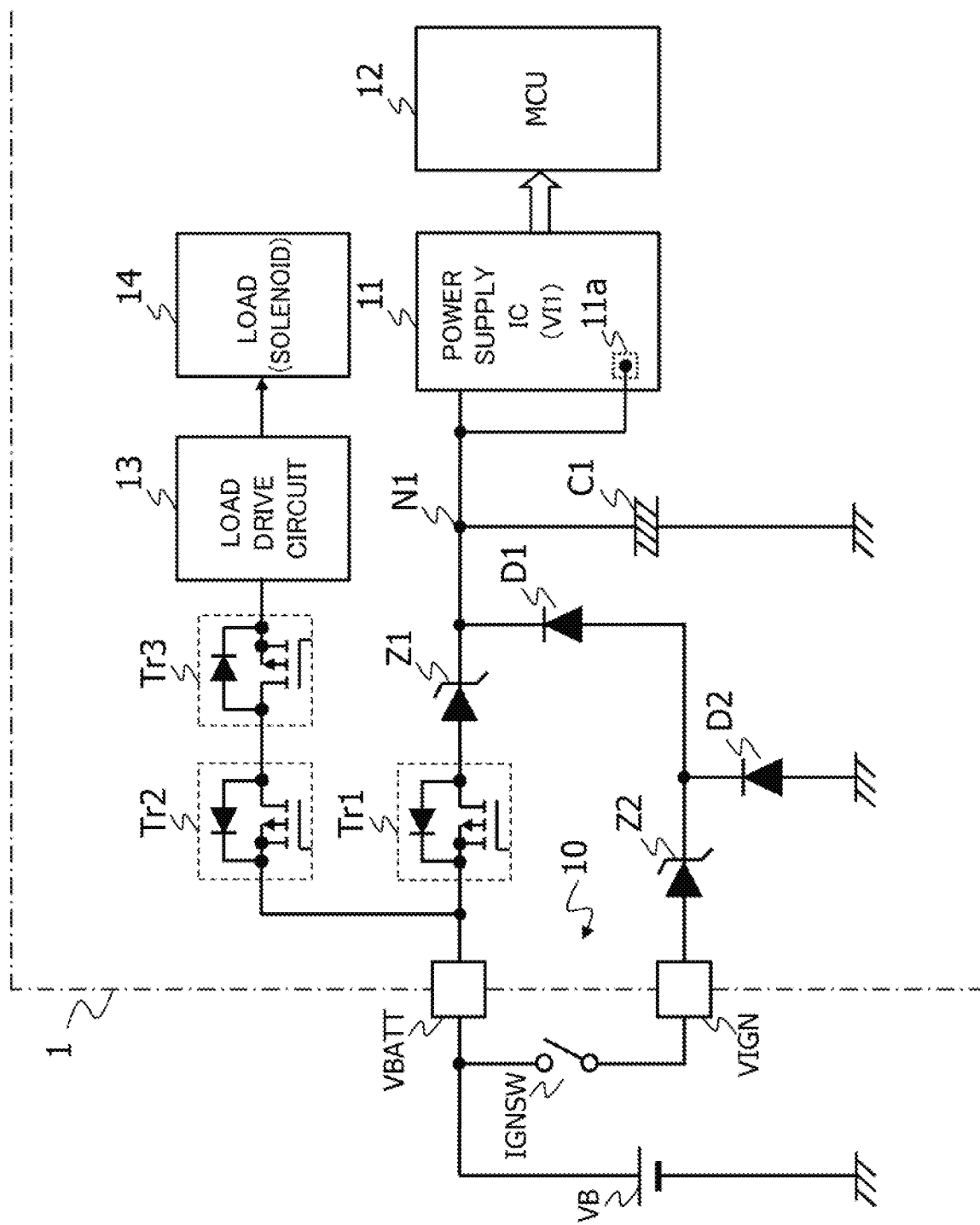
FIG. 1 is a circuit diagram showing a power input unit and its vicinity in an electronic control unit according to a first embodiment of the present invention.
Figure 2A:
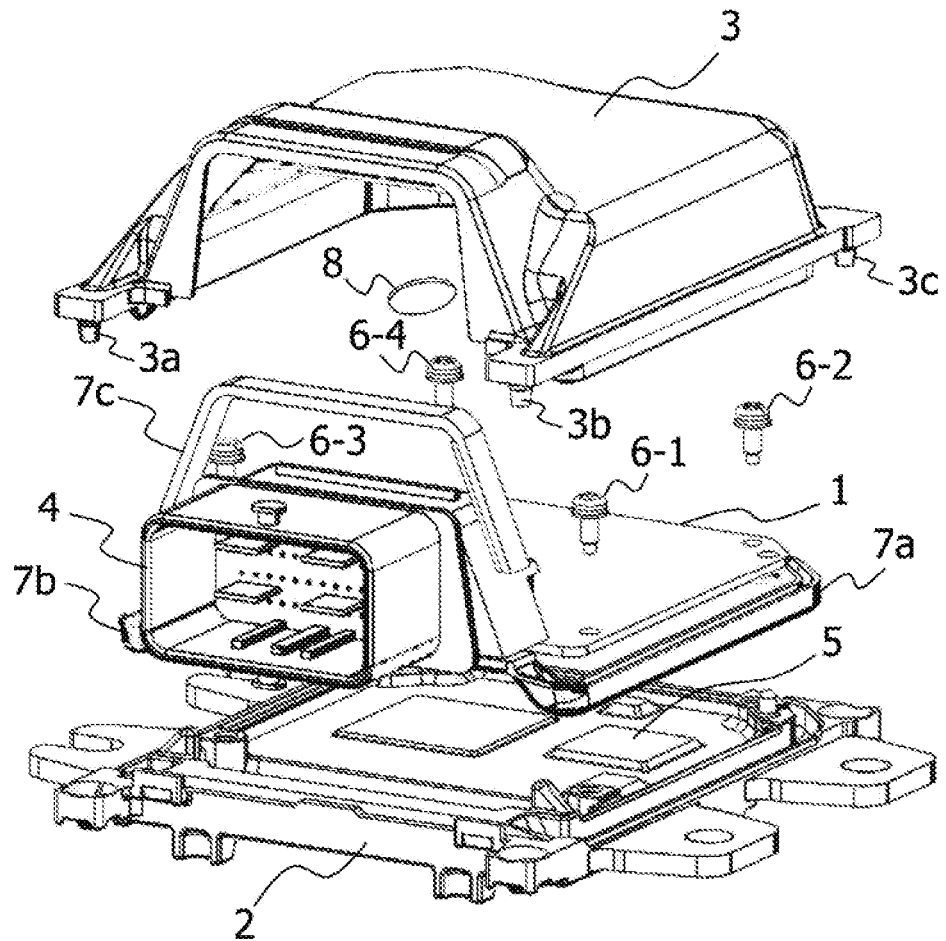
FIG. 2A is an exploded view showing a schematic configuration of a CVT electronic control unit to which the electronic control unit of the present invention is applied.
Figure 2B:
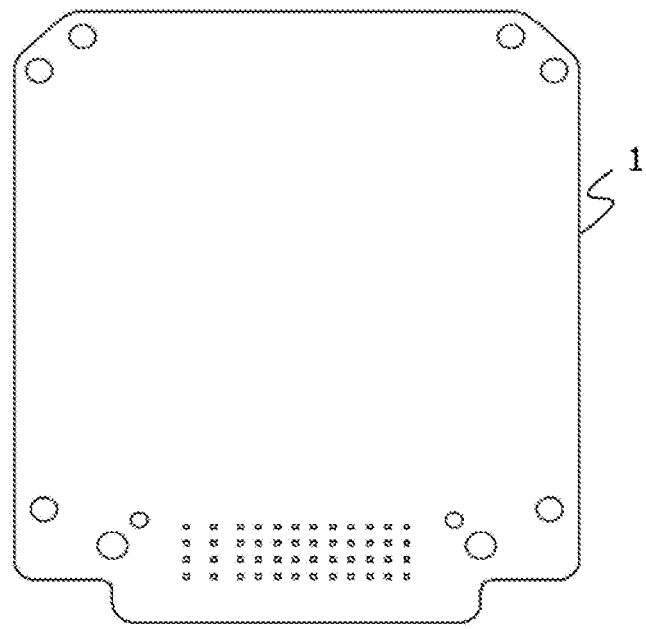
FIG. 2B is a plan view of a wiring board in the CVT electronic control unit shown in FIG. 2A.

FIG. 1 shows a circuit configuration of a power input unit and its vicinity in an electronic control unit according to a first embodiment of the present invention. FIGS. 2A and 2B show a schematic configuration of an electronic control unit for a continuously variable transmission (CVT), to which the electronic control unit of the present invention is applied. As shown in FIG. 2A, the electronic control unit includes a circuit board (PCB) 1, and a metal base 2 and a resin cover 3 between which circuit board 1 is placed. Circuit board 1 is accommodated in a space defined by metal base 2 and resin cover 3, and has a planar shape, as shown in FIG. 2B. Although not shown in the drawings, various electronic components are mounted on circuit board 1, and a connector 4 for electrical connection with external devices is provided such that connection portions are exposed from a side surface of resin cover 3.

Metal base 2 is made of a metal material superior in heat-radiating property, such as aluminum or iron. Connector 4 and resin cover 3 are made of, for example, a plastic material superior in strength and heat resistance, such as a PBT (polybutylene terephthalate) resin or a PPS (polyphenylene sulfide) resin. Corners of circuit board 1 are fastened to metal base 2 with circuit-board fastening screws 6-1 to 6-4. Heat generated from electronic components, particularly from high heat-generating electronic components, is transmitted to a heat radiation member 5 provided on metal base 2 on a surface on which circuit board 1 is mounted.

In order to ensure good airtightness of the electronic control unit, a sealing member 7a is placed between metal base 2 and resin cover 3, a sealing member 7b is placed between metal base 2 and connector 4, and a sealing member 7c is placed between resin cover 3 and connector 4. A liquid gasket (formed in place gasket, FIPG) may be used as sealing members 7a, 7b, 7c. As long as good airtightness of the electronic control unit is achieved, liquid adhesives, being fluid before curing, or O-rings may be used, for example. Resin cover 3 is provided with a vent hole, and a breather filter 8 for ventilating the inside of the electronic control unit and the outside environment is heat-welded thereon. Breather filter 8 is configured to allow only air to pass, and to prevent water or contaminants from passing therethrough. For example, metal base 2 and resin cover 3 are secured by heat caulking by heating and deforming bosses 3a, 3b, 3c, protruding from the four corners of the outer peripheral portion of resin cover 3.

As shown in FIG. 1, a power input unit 10 of circuit board 1 (electronic control unit) is provided with a power terminal VBATT and a power terminal VIGN. Power terminal VBATT is connected to the positive electrode of a battery (direct-current power supply) VB mounted in the vehicle, and power terminal VIGN is connected to the positive electrode of battery VB via an ignition switch (start switch) IGNSW.

To power terminal VBATT, the source of a P-channel MOSFET Tr1, which functions as a switching element for shutting off power, is connected. To the drain of MOSFET Tr1, the anode of a Zener diode Z1, which functions as a voltage limiting element, is connected. The cathode of Zenner diode Z1 is connected to an input terminal (connection point) N1 of power supply IC 11. To power terminal VIGN, the anode of a Zener diode Z2, which functions as a voltage limiting element, is connected. The cathode of Zener diode Z2 is connected to the anode of a diode D1. The cathode of diode D1 is connected to the cathode of Zener diode Z1 and input terminal N1 of power supply IC 11. The cathode of a diode D2 is connected to the anode of diode D1 and the cathode of Zener diode Z2. The anode of diode D2 is connected to ground. Furthermore, a capacitor (smoothing capacitor) C1 for preventing voltage from fluctuating is connected between input terminal N1 of power supply IC 11 and the ground. To input terminal N1 of power supply IC 11, a cutoff port 11a of power supply IC 11 is connected.

Power supply IC 11 reduces the voltage applied to power terminal VBATT from battery VB, to generate an internal operating voltage. The internal operating voltage generated by power supply IC 11 is supplied to an electronic device mounted in the vehicle, for example, a micro controller unit (MCU) 12 that controls an electric pump for hydraulic control of a drive pulley of a transmission. MOSFET Tr1 is turned off when the operation of power supply IC 11 or MCU 12 is stopped.

Furthermore, the input terminal of a load drive circuit 13 is connected to power terminal VBATT through a current path in which a P-channel MOSFET Tr2, which functions as a switching element for shutting off power, and a P-channel MOSFET Tr3 for reverse input protection, are provided in series. The source of MOSFET Tr2 is connected to power terminal VBATT, and the drain of MOSFET Tr2 is connected to the drain of MOSFET Tr3. The source of MOSFET Tr3 is connected to the input terminal of load drive circuit 13. The body diode of MOSFET Tr2 and the body diode of MOSFET Tr3 have opposite current flow directions. Load drive circuit 13 drives a load 14, such as a solenoid.

In the above circuit configuration, Zener voltage Vz1 of Zener diode Z1 is set to be greater than Zener voltage Vz2 of Zener diode Z2. That is, "Vz1>Vz2". When the operating voltage of power supply IC 11 is denoted as VI1 Zener voltages Vz1 and Vz2 of Zener diodes Z1 and Z2 are required to satisfy the following relationship (1), in order to ensure the operating voltage of power supply IC 11 at the time when a negative surge voltage occurs. Here, it is assumed that a negative surge voltage is applied to power terminals VBATT and VIGN, simultaneously.

$$-Vfd2-Vz2+Vz1 \geq VI1 \qquad (1)$$

Here, Vfd2 is a forward voltage of diode D2.

Figure 3:
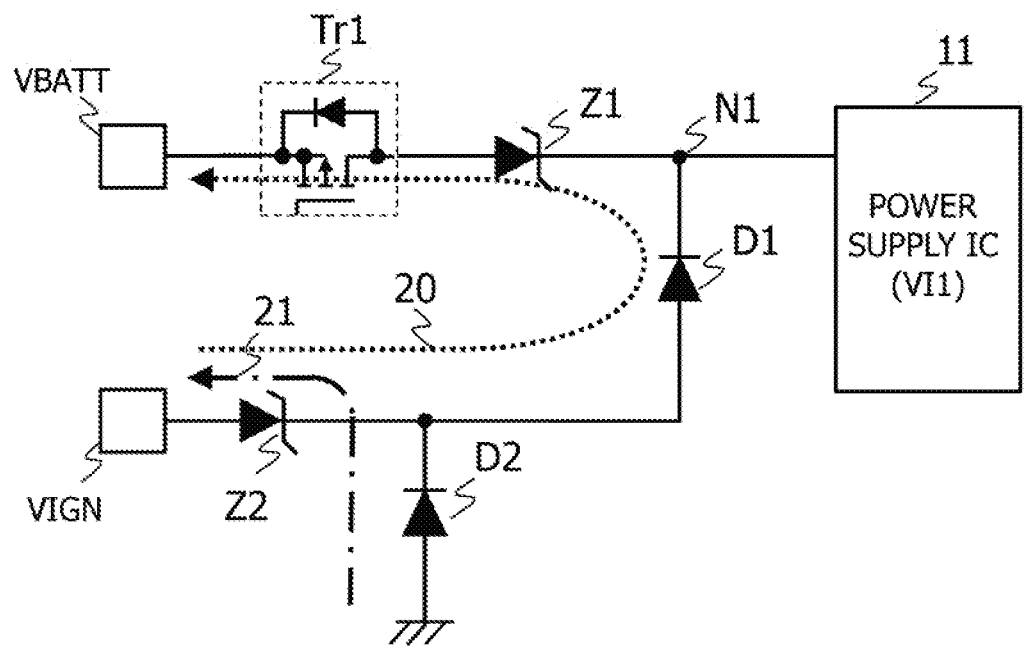
FIG. 3 is a circuit diagram showing a protection path when two power terminals in the circuit shown in FIG. 1, are individually applied with surge voltages.

FIG. 3 shows a protection path (surge discharge path) when power terminal VBATT and power terminal VIGN, in the circuit shown in FIG. 1, are individually applied with negative surges. When a negative surge voltage is applied to power terminal VBATT, Zener diode Z1 breaks down, and a current flows from power terminal VIGN to power terminal VBATT through the anode and cathode of Zener diode Z2, the anode and cathode of diode D1, the cathode and anode of Zener diode Z1, and the cathode and anode of the body diode of MOSFET Tr1, as indicated by a broken line 20. As a result, drain voltage VD of MOSFET Tr3 is as follows.

$$VD=Vign-Vfz2-Vfd1-Vzz1 \qquad (2)$$

Input voltage VI of power supply IC 11 is as follows.

$$VI=Vign-Vfz2-Vfd1 \qquad (3)$$

In the above equations (2) and (3), Vign is a voltage (voltage of battery VB) applied to power terminal VIGN, Vzz1 is a Zener voltage of Zener diode Z1, and Vfz2 is a forward voltage of Zener diode Z2.

This thereby suppresses negative excessive voltage to be applied to the internal circuit of the electronic control unit.

In contrast, when a negative surge voltage is applied to power terminal VIGN, Zener diode Z2 breaks down, and a current flows from the ground to power terminal VIGN through the anode and cathode of diode D2, and the cathode and anode of Zener diode Z2, as indicated by a chain line 21. As a result, drain voltage VD of MOSFET Tr3 is as follows.

$$VD=Vbatt \qquad (4)$$

Input voltage VI of power supply IC 11 is as follows.

$$VI=Vbatt-Vfz1 \qquad (5)$$

In the above equations (4) and (5), Vbatt is a voltage (voltage of battery VB) applied to power terminal VBATT.

This thereby suppresses negative excessive voltage to be applied to the internal circuit of the electronic control unit. Thus, diode D2 is used for both the protection operation when a surge voltage is applied to power terminal VBATT and the protection operation when a surge voltage is applied to power terminal VIGN.

Next, a specific example will be described. In order to simplify the description, it is assumed that Zener voltage Vz1 of Zener diode Z1 is 40 V, Zener voltage Vz2 of Zener diode Z2 is 20 V, forward voltage Vfd1 of diode D1 is 1 V, forward voltage Vfz2 of Zener diode Z2 is 1 V, and a surge voltage of −100 V is applied to power terminal VBATT in a state in which a voltage of 14 V is applied from battery VB to power terminal VIGN. The voltage at the anode of Zener diode Z1 is "14−1−1−40=−28", which is not completely equal to the negative surge voltage applied to power terminal VBATT. Thus, the difference between the source and the drain of reverse input protection MOSFET Tr3 is reduced. Therefore, an inexpensive element with low breakdown voltage can be used for MOSFET Tr3.

On the other hand, assuming that a surge voltage of −100 V is applied to power terminal VIGN in a state in which a voltage of 14 V is applied to power terminal VBATT from battery VB, Zener diode Z2 breaks down. Thus, large voltage is not applied between the source and drain of reverse input protection MOSFET Tr3.

Figure 4:
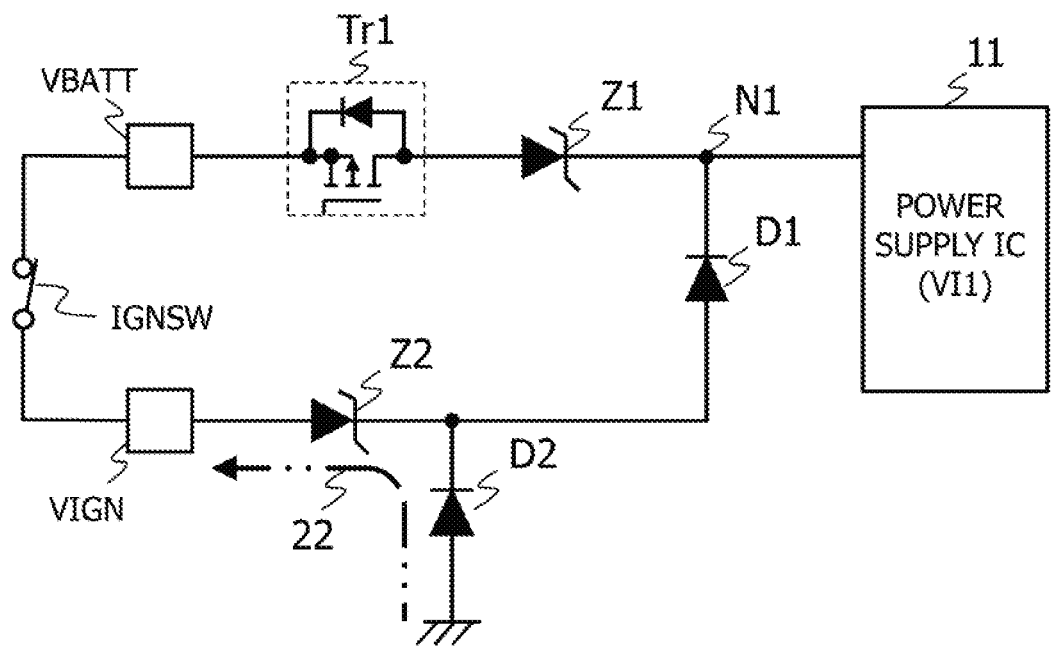
FIG. 4 is a circuit diagram showing a protection path when two power terminals in the circuit shown in FIG. 1, are simultaneously applied with surge voltages.

FIG. 4 shows a protection path when power terminal VBATT and power terminal VIGN, in the circuit shown in FIG. 1, are simultaneously applied with negative surges. For example, this shows a case in which a negative surge voltage is applied to power terminal VBATT or power terminal VIGN in a state in which ignition switch IGNSW is turned on. Zener voltage Vz1 of Zener diode Z1 is set to be greater than Zener voltage Vz2 of Zener diode Z2. Thus, when a negative surge is applied, Zener diode Z2 breaks down first, and a current flows from the ground to power terminal VIGN through the anode and cathode of diode D2, and the cathode and anode of Zener diode Z2, as indicated by a chain double-dashed line 22.

As a result, drain voltage VD of MOSFET Tr3 is as follows.

$$VD=-Vfd2-Vz2 \qquad (6)$$

Input voltage VI of power supply IC 11 is as follows.

$$VI=-Vfd2-Vz2+Vz1 \qquad (7)$$

This thereby suppresses negative excessive voltage being applied to the internal circuit of the electronic control unit. Furthermore, since Zener diode Z1 does not break down, the voltage of input terminal N1 of power supply IC 11 (power supply voltage) can be maintained, and thus, it is possible to prevent the operation of power supply IC 11 from being stopped, and to prevent MCU 12 from being reset in the next stage.

FIG. 5 shows relationships between drain voltage VD of reverse input protection MOSFET Tr3 and input voltage VI of power supply IC 11, when a negative surge is applied to each of the abovementioned power supply terminals. Even if an excessive surge voltage of −100 V is applied to one or both of power terminals VBATT and VIGN, voltage VD applied to the drain of MOSFET Tr3 is reduced. Thus, it is possible to prevent MOSFET Tr3 from being damaged. Furthermore, since an expensive element having a high breakdown voltage is not required for MOSFET Tr3, it is possible to reduce an increase in cost. Furthermore, since input voltage VI of power supply IC 11 does not decrease below operating voltage VI1, it is possible to prevent the operation of power supply IC 11 from being stopped or MCU 12, to which the operating power is supplied from power supply IC 11, from being reset.

In this manner, the voltage on power terminal VBATT side is limited to a predetermined first negative voltage (Zener voltage Vz1) by Zener diode Z1, and the voltage on power terminal VIGN side is limited by Zener diode Z2 to a predetermined second negative voltage (Zener voltage Vz2), it is possible to prevent an excessive negative voltage from being applied to power terminals VBATT and VIGN, so as to protect the internal circuit from a negative surge voltage.

Furthermore, since Zener voltage Vz1 (limit voltage) of Zener diode Z1 is greater than Zener voltage Vz2 of Zener diode Z2, it is possible to prevent a decrease in input terminal voltage, which might cause shutdown of power supply IC 11 and reset of MCU 12. Furthermore, since diode D2 provided in the current path extending from power terminal VIGN to power supply IC 11 is shared by the first and second surge discharge paths (broken line 20 and chain line 21), it is possible to achieve a simple circuit configuration with a reduced number of components, having a surge protection function and a reverse input protection function, equivalent to those in conventional art.

Accordingly, since the number of components is reduced, it is possible to reduce the mounting area on circuit board 1, resulting in reduction in size, and since it is not necessary to use an expensive, high breakdown voltage MOSFET, it is possible to reduce cost.

Second Embodiment

Figure 6:
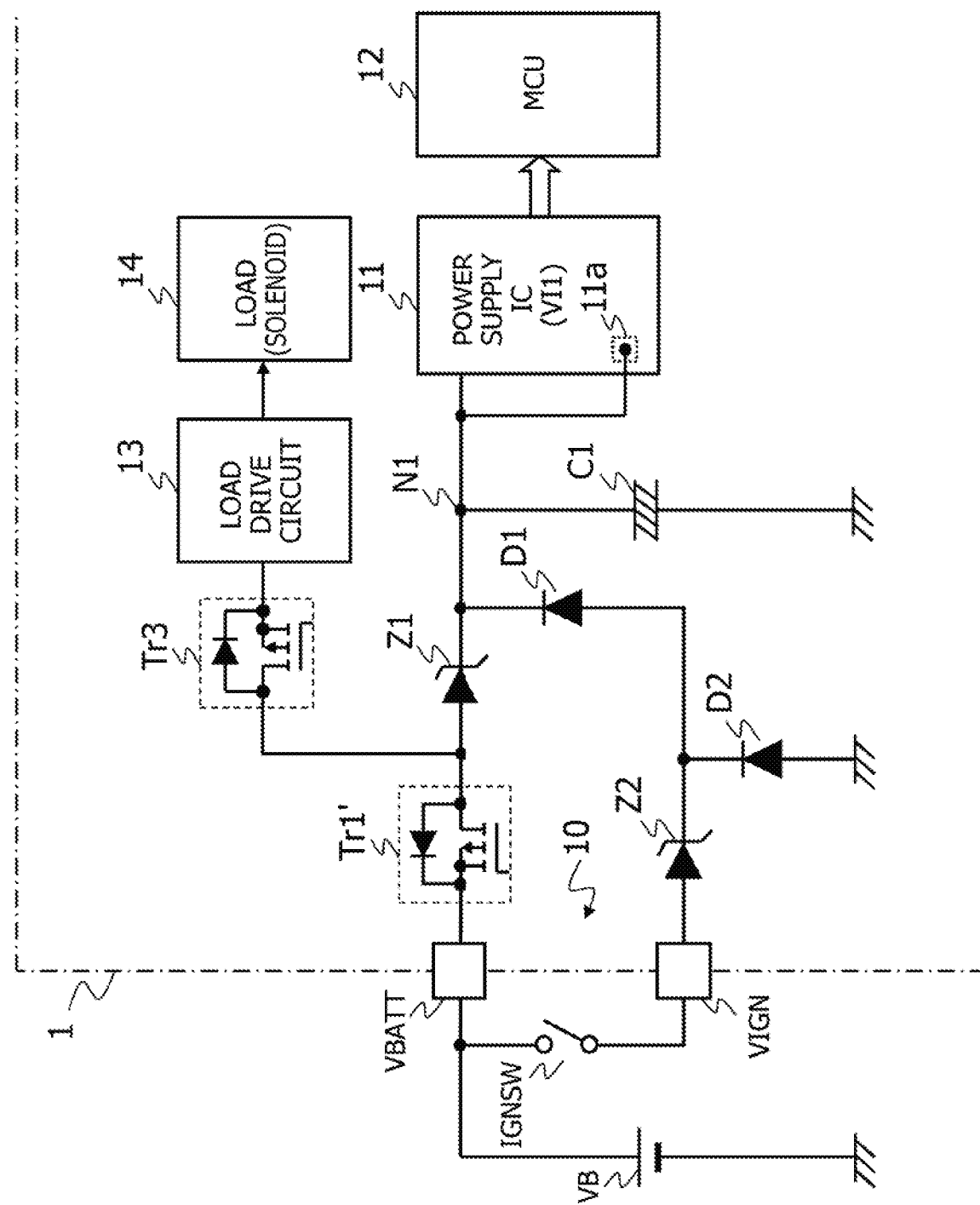
FIG. 6 is a circuit diagram showing a power input unit and its vicinity in an electronic control unit according to a second embodiment of the present invention.

FIG. 6 shows a circuit configuration of a power input unit and its vicinity in an electronic control unit according to a second embodiment of the present invention. In the second embodiment, single common MOSFET Tr1 is used, instead of MOSFETs Tr1 and Tr2 in the first embodiment. That is, MOSFET Tr2 is omitted, and thus, the source of MOSFET Tr1 is connected to power terminal VBATT, and the drain of MOSFET Tr1 is connected to the anode of Zener diode Z1 and the drain of MOSFET Tr3.

Other configurations are similar to those in FIG. 1. The same components are denoted by the same reference symbols, and their descriptions will be omitted.

In the abovementioned configuration, when the voltage applied to power terminal VIGN is denoted as Vign, the forward voltage of Zener diode Z2 is denoted as Vfz2, the forward voltage of diode D1 is denoted as Vfd1, the Zener voltage of Zener diode Z1 is denoted as Vz1, and the maximum drain-source rated voltage of MOSFET Tr3 is denoted as Vdc_max, the following relationship (8) is satisfied.

$$Vign-Vfz2-Vfd1-Vz1<Vdc\_max \quad (8)$$

Then, Zener voltage Vz1 of Zener diode Z1 is set such that the voltage applied to MOSFET Tr3 is less than or equal to the absolute maximum rated voltage. This causes Zener diode Z2 to break down when the voltage applied to MOSFET Tr3 is less than or equal to the absolute maximum rated voltage, so that it is possible to effectively protect MOSFET Tr3 while further reducing the number of elements compared with the first embodiment.

Accordingly, it is possible to reduce the mounting area on circuit board 1, resulting in reduction in size, and since it is not necessary to use an expensive, high breakdown voltage MOSFET, it is possible to reduce cost.

Although the present invention is described according to the first and second embodiments in the foregoing, the present invention is not limited thereto. Various modifications are possible without departing from the scope of the invention in the operational phase.

For example, although the present invention is described applied to the electronic control unit for a CVT, as an example, the present invention is not limited thereto. Furthermore, the above embodiments include inventions at various stages, and various inventions may be extracted by appropriately combining multiple constituent elements disclosed herein. For example, even if some of all constituent elements indicated in the embodiments are deleted, as long as at least one of the problems described in the "Problem to be Solved by the Invention" can be solved and at least one of the effects described in the "Effects of the Invention" can be obtained, such configuration in which the constituent elements are deleted may be selected as an invention.

REFERENCE SYMBOL LIST

1 Circuit board
10 Power input unit
11 Power supply IC
11a Cutoff port
12 MCU
13 Load drive circuit
14 Load (solenoid)
VB Battery
IGNSW Ignition switch (start switch)
VBATT Power terminal (first power terminal)
VIGN Power terminal (second power terminal)
Tr1 to Tr3 MOSFET (switching element)
Z1 Zener diode (first voltage limiting element)
Z2 Zener diode (second voltage limiting element)
D1 Diode (first diode)
D2 Diode (second diode)

The invention claimed is:

1. An electronic control unit comprising:
   a first power terminal to which a voltage is applied from a battery mounted on a vehicle;
   a second power terminal to which a voltage is applied from the battery via a start switch;
   a power supply IC that generates an internal operating voltage from the voltages applied to the first and second power terminals from the battery;
   a first voltage limiting element provided between the first power terminal and an input terminal of the power supply IC, the first voltage limiting element being configured to limit a voltage on the first power terminal side to a predetermined negative voltage;
   a first diode having a cathode that is connected to the input terminal of the power supply IC;
   a second voltage limiting element provided between the second power terminal and an anode of the first diode, the second voltage limiting element being configured to limit a voltage on the second power terminal side to a predetermined negative voltage greater than a limit voltage of the first voltage limiting element; and
   a second diode having a cathode that is connected to the anode of the first diode, and an anode that is grounded.

2. The electronic control unit according to claim 1, further comprising:
   a first switching element for shutting off a current, placed between the first power terminal and the first voltage limiting element;
   a load drive circuit that drives a load;
   a second switching element for shutting off a current; and
   a third switching element for reverse input protection,
   wherein the second switching element and the third switching element are arranged in series between the first power terminal and an input terminal of the load drive circuit.

3. The electronic control unit according to claim 2, wherein the first switching element is turned off when operation of the power supply IC is stopped.

4. The electronic control unit according to claim 2, wherein the first voltage limiting element is a first Zener diode, the second voltage limiting element is a second Zener diode, and a Zener voltage of the first Zener diode is less than an absolute maximum rated voltage of the third switching element for reverse input protection.

5. The electronic control unit according to claim 4, wherein the Zener voltage of the first Zener diode is less than a Zener voltage of the second Zener diode.

6. The electronic control unit according to claim 2, wherein each of the first switching element, the second switching element, and the third switching element is a MOSFET.

7. The electronic control unit according to claim 1, further comprising:
   a first switching element for shutting off a current, placed between the first power terminal and the first voltage limiting element;
   a load driving circuit that drives a load; and
   a second switching element for reverse input protection, provided between an input terminal of the load driving circuit, and a connection point between the first switching element and the first voltage limiting element.

8. The electronic control unit according to claim 7, wherein the first switching element is turned off when operation of the power supply IC is stopped.

9. The electronic control unit according to claim 6, wherein the first voltage limiting element is a first Zener diode, the second voltage limiting element is a second Zener diode, and a Zener voltage of the first Zener diode is less than an absolute maximum rated voltage of the second switching element for reverse input protection.

10. The electronic control unit according to claim 9, wherein the Zener voltage of the first Zener diode is less than a Zener voltage of the second Zener diode.

11. The electronic control unit according to claim 7, wherein each of the first switching element and the second switching element is a MOSFET.

12. The electronic control unit according to claim 1, wherein the input terminal of the power supply IC is connected to a cutoff port of the power supply IC.

13. The electronic control unit according to claim 1, further comprising a capacitor connected between the input terminal of the power supply IC and ground, the capacitor being configured to prevent voltage from fluctuating.

14. The electronic control unit according to claim 1, further comprising a micro controller unit (MCU), to which the internal operating voltage generated in the power supply IC is supplied, the MCU being configured to control an electronic device mounted on the vehicle.

15. The electronic control unit according to claim 1, further comprising:
 a circuit board on which the power supply IC, the first voltage limiting element, the first diode, the second voltage limiting element, and the second diode are mounted;
 a metal base on which the circuit board is mounted; and
 a resin cover defining, together with the metal base, a space for accommodating therein the circuit board.

16. The electronic control unit according to claim 15, further comprising a connector for electrical connection with an external device, the connector being provided such that a connection portion is exposed from a side surface of the resin cover.

* * * * *